United States Patent [19]

Ichikawa et al.

[11] Patent Number: 4,824,633
[45] Date of Patent: Apr. 25, 1989

[54] METHOD AND APPARATUS FOR CONTROLLING REFUELLING MACHINE OF REACTOR

[75] Inventors: Yoshiaki Ichikawa, Hitachiota; Makoto Senoh, Ibaraki; Kenji Tsuchita, Hitachiota; Akira Koizumi, Hitachi; Kunihiko Iwama, Katsuta, all of Japan

[73] Assignee: Hitachi, Ltd., Tokyo, Japan

[21] Appl. No.: 101,132

[22] Filed: Sep. 25, 1987

[30] Foreign Application Priority Data

Sep. 26, 1986 [JP] Japan .................. 61-227215

[51] Int. Cl.⁴ .............................. G21C 19/00
[52] U.S. Cl. ................... 376/268; 376/258; 376/271
[58] Field of Search .......... 376/271, 268, 264, 261, 376/258; 364/478, 513; 414/146, 273; 294/906; 212/98; 901/16

[56] References Cited

U.S. PATENT DOCUMENTS 4,308,100 12/1981 Albin .................... 376/271
4,385,028 5/1983 Salaman ................ 376/264
4,427,623 1/1984 Howard et al. ........ 376/271
4,487,741 12/1984 Vuckovich et al. ... 376/271
4,659,536 4/1987 Baudro ................. 376/261
4,713,212 12/1987 Plumier ................ 376/268
4,715,111 12/1987 Kapoor et al. ........ 376/271

FOREIGN PATENT DOCUMENTS 0034392 2/1983 Japan .
0065192 4/1986 Japan .
0149897 7/1986 Japan .

OTHER PUBLICATIONS

"Swiss Station Will Be Semi-Automated", NEI, pp. 42-44, Fontaine et al., 7-81.

Primary Examiner—Deborah L. Kyle
Assistant Examiner—Daniel Wasil
Attorney, Agent, or Firm—Antonelli, Terry & Wands

[57] ABSTRACT

A method and an apparatus for controlling a reactor refuelling machine including a plurality of grippers comprised of a plurality of telescopic bars which are telescopically actuatable independently of each other and at least one gripping member mounted to each telescopic bar. A decision is made as to whether the movement of a particular gripper in the Z direction is constrained by a status of the movement of a different gripper. The parallel operation is performed when the movement of the particular gripper in the Z direction is not constrained and when constrained, the particular gripper is placed in condition for waiting.

8 Claims, 10 Drawing Sheets

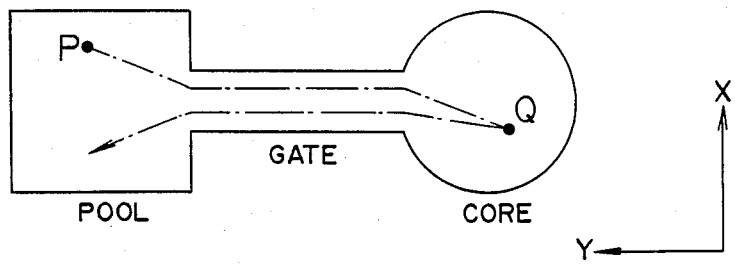
FIG. 4a
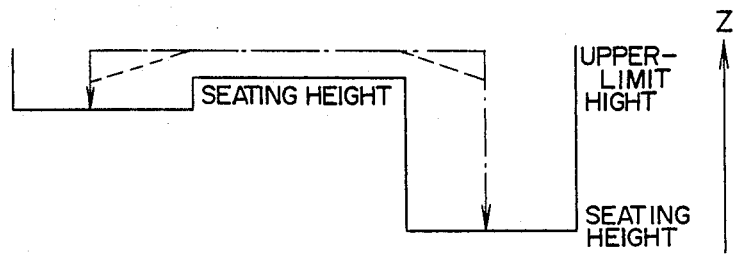
FIG. 4b
FIG. 5
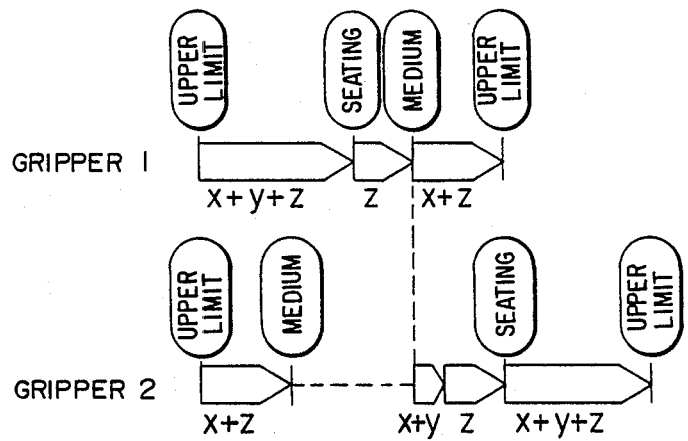

4,824,633

METHOD AND APPARATUS FOR CONTROLLING REFUELLING MACHINE OF REACTOR

BACKGROUND OF THE INVENTION

This invention relates to a method and an apparatus for controlling fuel exchange and more particularly to refuelling control method and apparatus suitable for manipulating a plurality of fuel grippers.

In a prior art atomic power plant, upon exchange of atomic fuel, the atomic fuel is transferred between a reactor core and a fuel storage pool by a single fuel gripper, as disclosed in JP-A-58-34392. To speed up the fuel transfer, the fuel gripper must therefore be operated at an increased speed but the speed of the fuel gripper is permitted to be increased within only a limited range because the highest safety is required of the power plant. With the view of reducing the time required for transfer, JP-A-61-65192 and JP-A-61-149897 also propose a method which uses a refuelling machine having a plurality of grippers for gripping a plurality of fuel elements, whereby a plurality of fuel elements are gripped simultaneously and then transferred between a reactor core, hereinafter called a core, and a fuel storage pool (hereinafter called a pool).

In JP-A-61-65192, however, the simultaneity is only valid for the horizontal transfer between the pool and the core as well as for the horizontal motion in two directions namely, the X and Y directions, and, as a result, the effect of the paralleling (simultaneity) of operation is limited in part. However, JP-A-61149897, neither clearly describes the paralleling of operation nor discloses a specific means for realizing the parallel operation.

Thus, under the circumstances, it is desired that as many operations as possible be performed in parallel in order to efficiently effect fuel exchange. Actually, however, a space for mounting the refuelling machine is so limited that mounting of a plurality of, even only two, grippers is almost impossible if the grippers are perfectly mutual non-interfering. Accordingly, a technical task is to provide the manner of performing as many operations as possible by using a plurality of grippers which mutually impose constraint.

SUMMARY OF THE INVENTION

An object of this invention is to solve the above task and effect fuel exchange with high efficiency.

According to the invention, a refuelling machine of reactor comprises a plurality of grippers. Each gripper is comprised of a plurality of telescopic bars which are telescopically actuatable independently of each other and at least one gripping member (grapple) mounted to each telescopic bar. A method for controlling the reactor refuelling machine comprises deciding whether the movement of a particular gripper in the Z direction is constrained by a status of the movement of a different gripper, and performing the parallel operation when the movement of the particular gripper in the Z direction is not constrained and placing the particular gripper in condition for waiting when constrained. An apparatus for controlling the reactor refuelling machine comprises gripper manipulation procedure memory means for storing operations to be carried out by respective grippers in sequence of steps, allowed motion direction deciding means for determining a gripper which is manipulated preferentially hereinafter referred to as the preferential gripper during a step presently under course of execution, hereinafter referred to as an execution step, and determining every moment allowable directions of the movement (directions of allowed motion) of individual grippers inclusive of the preferential one, gripper controlling means for causing the individual grippers to perform the operations to be carried out thereby in accordance with the determined directions of allowed motion during the execution step and the succeeding step, and execution step managing means for deciding the end of the execution step and permitting the procedure to proceed to a subsequent execution step. In the case of manual operation, however, the gripper manipulation procedure memory means and the execution step managing means may be eliminated.

The allowed motion direction deciding means determines a preferential gripper during an execution step and decides as to which directions, two horizontal directions, namely upward and downward directions namely, the individual grippers inclusive of the preferential gripper are allowed to freely move in, that is, decides directions of allowed motion of the individual grippers inclusive of the preferential gripper on the basis of a horizontal position and a vertical position or height of each gripper, whether each gripper suspends a fuel element, whether the suspended fuel element is shaking and whether a gripper in question is the preferential gripper. The gripper controlling means causes the preferential gripper to preferentially perform an operation during an execution step in accordance with its allowed motion direction while permitting a non-preferential gripper to perform an operation in parallel with the operation of the preferential gripper during the execution step and the succeeding step in accordance with its allowed motion direction as far as the operation of the non-preferential gripper does not interfere with the operation of the preferential gripper.

In this manner, the paralleling of operation of the individual grippers can proceed efficiently while the individual grippers are prevented from interfering with each other and with various parts of facilities of the reactor.

BRIEF DESCRIPTION OF THE DRAWINGS

FIGS. 4a, 4b and 5 are diagrams useful in explaining the basic concept of the invention;

DESCRIPTION OF THE PREFERRED EMBODIMENTS

The invention will now be described by way of example with reference to the accompanying drawings.

In nuclear power plants, used fuel must be exchanged with fresh fuel at the expiration of a predetermined period of time for operation. In a 1,100,000 Kw class boiling-water reactor, about 800 fuel elements are accommodated in a core and each time the necessity of fuel exchange or refuelling occurs, ¼ to ⅓ of the total fuel elements are brought back to a pool and thereafter fresh fuel elements previously accommodated in the pool are brought into the core. For this procedure, specifications of fuel exchange are prepared which prescribe a position in the core at which a fuel element to be removed is located and a position in the core to which a fresh fuel element is to be placed.

Figure 1:
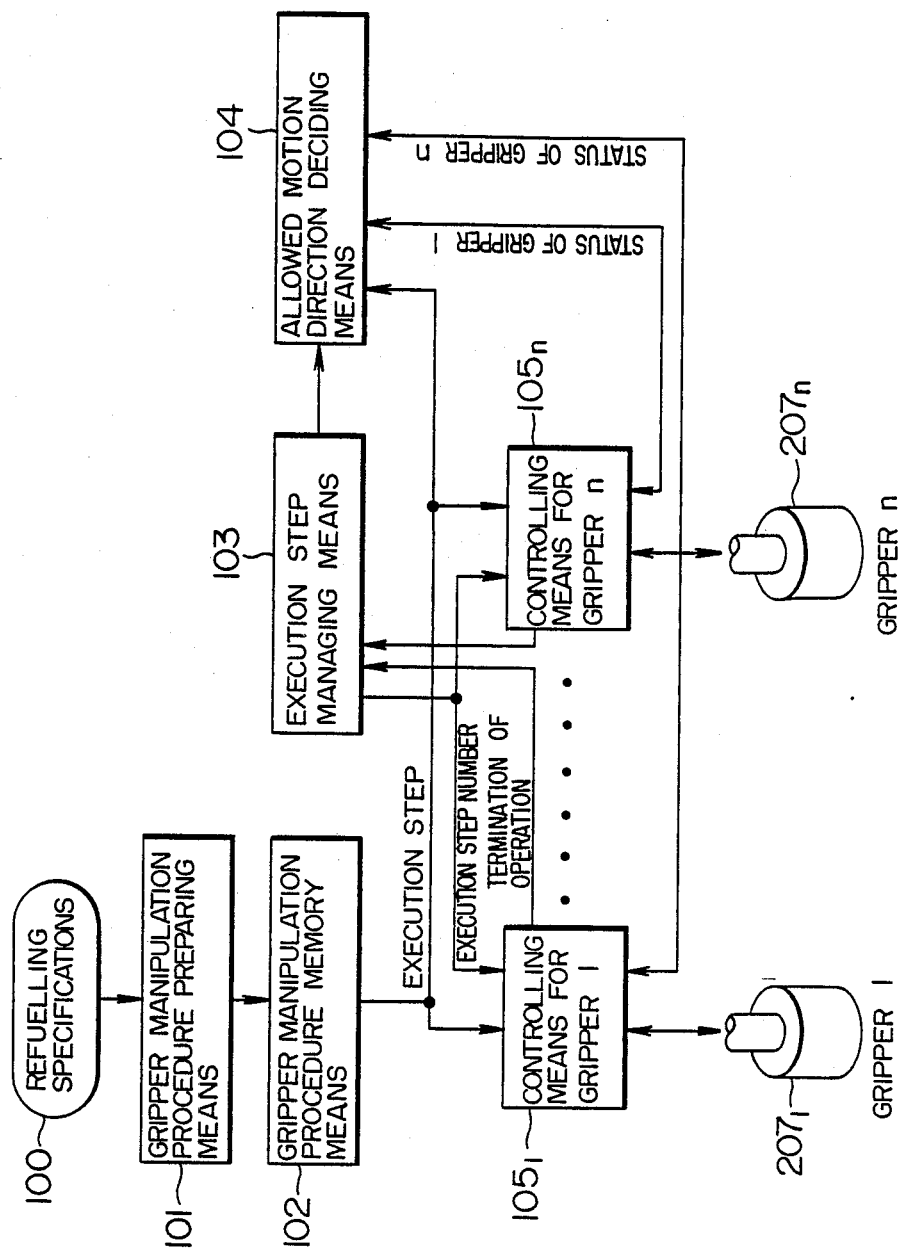
FIG. 1 is a schematic block diagram showing the overall construction of a refuelling control apparatus of the invention.
Figure 6:
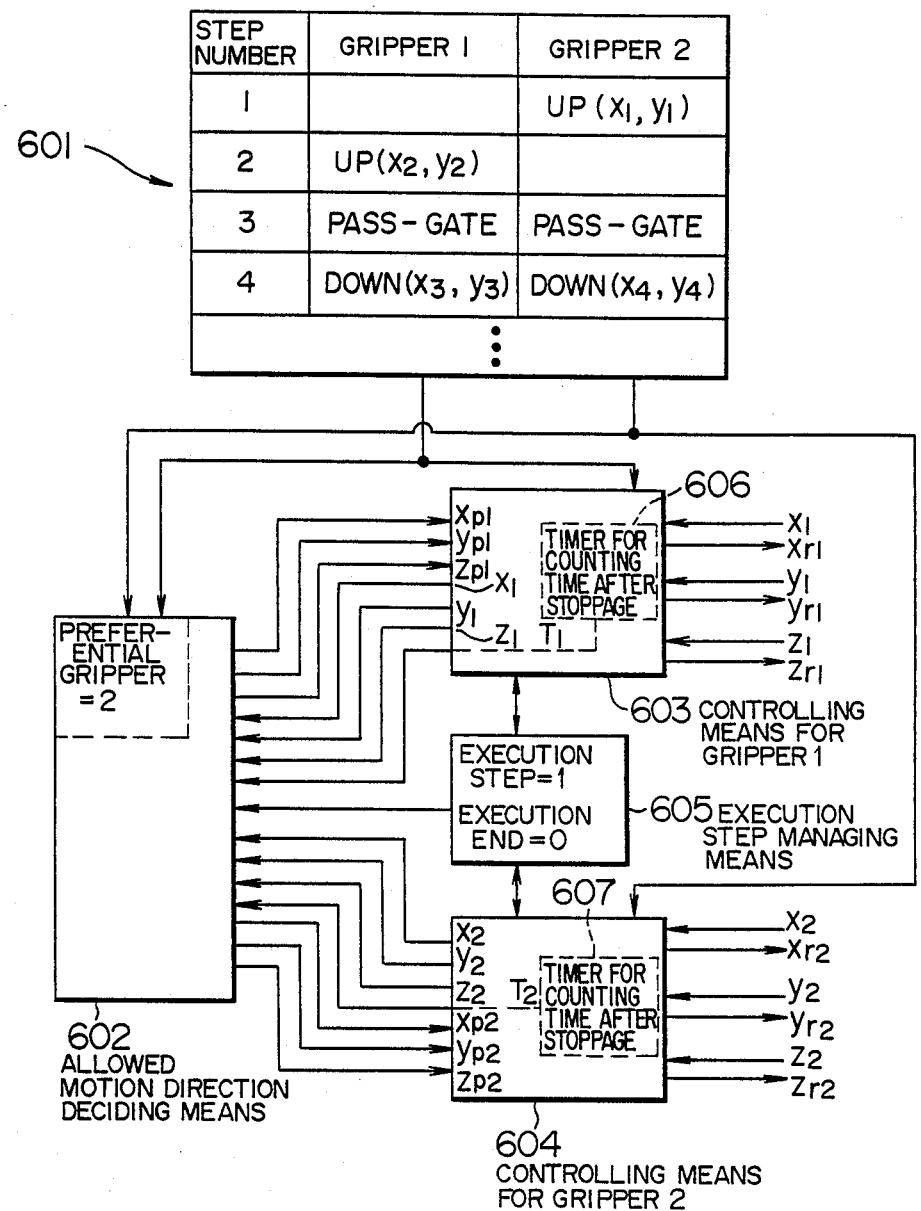
FIG. 6 is a block diagram schematically showing the overall construction of a refuelling control apparatus according to an embodiment of the invention.

The overall construction of a refuelling control apparatus of the invention is illustrated in FIG. 1. Referring to FIG. 1, a gripper manipulation procedure preparing means 101 prepares, on the basis of refuelling specifications 100, a gripper manipulation procedure which prescribes manipulation of each of a plurality of (n) grippers in sequence of step numbers, and the prepared manipulation procedure is stored in a gripper manipulation procedure memory means 102. As shown in FIG. 6, the gripper manipulation procedure describes step numbers and corresponding operations for a single or plural grippers. The operation involved herein consists of:

UP (x,y) . . . raise a fuel element located at a position (x,y).

DOWN (x,y) . . . lower a fuel element to a position (x,y).

PASS-GATE . . . pass a gripper through a gate (between core and pool).

An execution step managing means 103 functions to hold a number indicative of an execution step, i.e., a step presently under course of execution and increment the execution step number by one when it decides that the execution step ends. An allowed motion direction deciding means 104 decides as to which direction of, for example, three directions X, Y and Z is either allowable or constraint in order for each gripper to move, and transmits a decision result to a gripper controlling means $105_i$ (i=1, . . . n) associated with respective gripping members $207_i$ (i=1, . . . n). The gripper controlling means $105_i$ control the gripping members $207_i$ in accordance with the direction of allowed motion.

Figure 2:
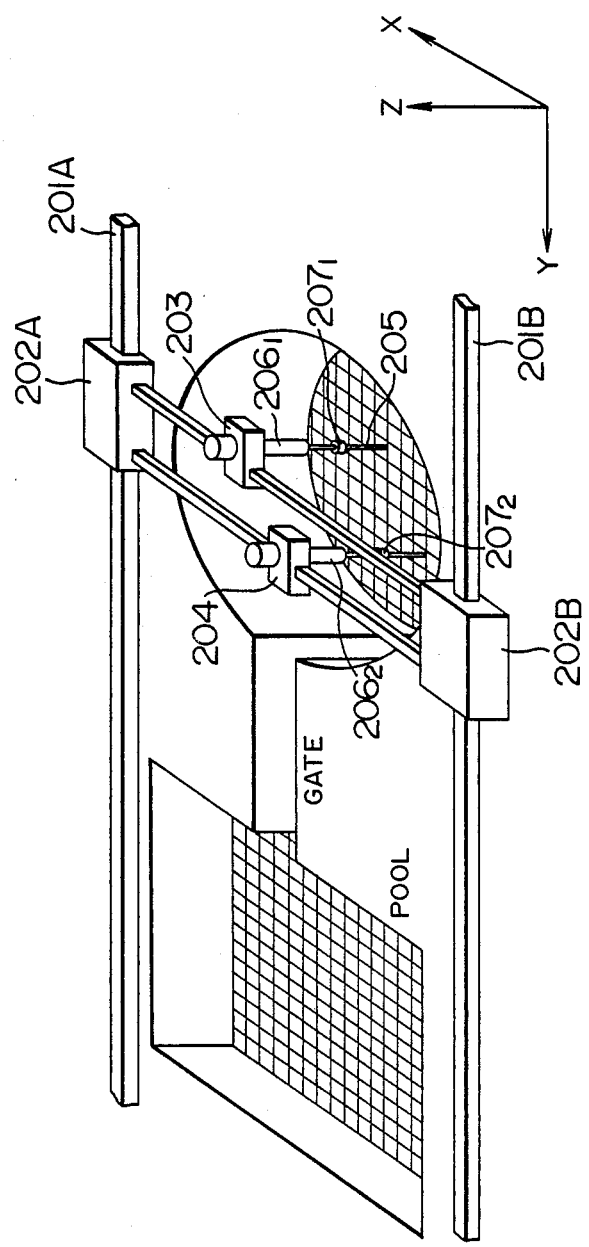
FIG. 2 is a fragmentary perspective view illustrating refuelling facilities of the reactor to which the invention is applied.

To describe the above individual means in greater detail, reference is made to an exemplary refuelling machine having two grippers with gripping members $207_1$ and $207_2$ as illustrated in FIG. 2. Referring to a perspective illustration as viewed from above, fixedly interlocked carriers 202A and 202B run on rails 201A and 201B which are installed on either side of a gate serving as a conduit interconnecting a core and a pool, in Y coordinate axis direction. Two transverse carriers 203 and 204 are movable independently of each other between the two carriers 202A and 202B in X coordinate axis direction. Telescopic bars $206_1$ and $206_2$ extend downwards from the transverse carriers 203 and 204 and have, at their tips, the gripping members $207_1$ and $207_2$. Fuel elements 205 are gripped and raised by the gripping members, respectively. Thus, the two grippers $207_1$, $207_2$ have allowed motion in the X and Z directions and mutually interfere in Y direction.

Figure 3:
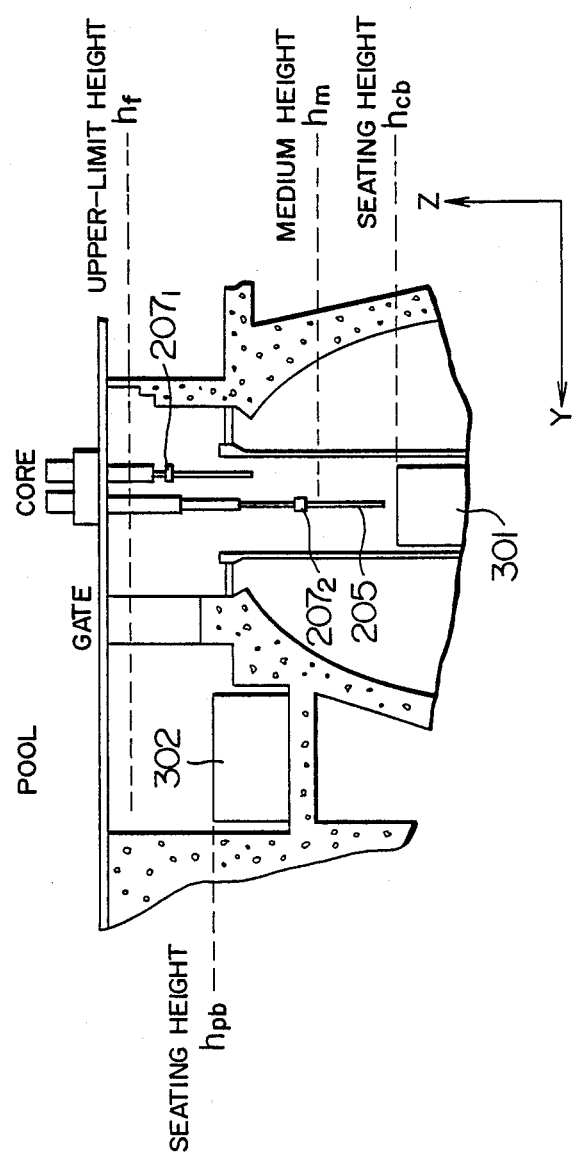
FIG. 3 is a longitudinal sectional view of the FIG. 2 facilities.

FIG. 3 is a sectional view parallel to the Y/Z plane of FIG. 2. In the core, a seating height $h_{cb}$ defines a height at which the gripping member $207_1$ or $207_2$ stays when it loads a fuel element 205 into a fuel channel 301 of the core, a medium height $h_m$ defines a lower-limit height at which the gripping member can pull out the fuel element beyond the fuel channel 301, and an upper-limit height $h_f$ defines a height at which the gripping member suspending the fuel element is permitted to freely move horizontally. In the pool, a seating height $h_{pb}$ defines a height at which the gripping member stays when it loads the fuel element into a fuel rack 302. Schematic plan view of FIG. 4a and a schematic elevation view of FIG. 4b are useful in explaining a series of operations in which a single gripper brings out a fuel element located at a position P in the pool, loads the fuel element to a position Q in the core and thereafter returns to the pool. In the case of the conventional procedure, principally, of serial operation type including sequential Z-direction movement, X/Y-direction movement, Z-direction movement . . . , the gripper traces a chained line path. In this instance, the horizontal transfer within the gate and the horizontal motion in two directions (X and Y directions) are paralleled. In improving this procedure by introducing the paralleling (simultaneity) in Z direction, the paralleling is permitted only between X/Y-direction movement and Z-direction movement within the core and pool, as illustrated at dotted line in FIG. 4b. Actually, however, the time required for Z-direction movement is far longer than the time required for X/Y-direction movement and therefore the effect of the paralleling attained by only one gripper can not be highly evaluated.

As an example, two grippers are used in accordance with teachings of the present invention, as shown in FIG. 5. Presuming that the two grippers are modeled after those shown in FIGS. 2 and 3, a gripper 1 first departs from the inlet/outlet of the gate to load a fuel element into the core and subsequently, a gripper 2 loads a fuel element to a different position in the core and then returns to the gate inlet/outlet. In such an instance, while the gripper 1 lowers from the upper-limit height to reach the seating height, the gripper 2 is permitted to lower from the upper-limit height until the medium height. Further, as soon as the gripper 1 which has finished loading rises beyond the medium height, the gripper 2 is permitted to start operation of its own. In other words, the gripper 1 acts as a preferential gripper by then but the gripper 2 acts as a preferential gripper from then. As described previously, the time for Z-direction movement is very long and especially it takes a long time for the gripper to rise or lower between the upper-limit and medium heights. This accounts for significant effects of this parallel operation. It will therefore be appreciated that only on the presumption that a plurality of grippers are used, significant effects of the paralleling can be expected. More importantly, it is not always necessary that the complete parallel operation be realized wherein a plurality of grippers simultaneously reach loading positions for which they are respectively destined so as to perform raising or lowering of fuel elements at a time because the time-saving effect can be obtained by carrying out the partial paralleling wherein an anticipatory operation in preparation for the succeeding step is effected as can be seen from the example of FIG. 5. In many applications, the complete paralleling is in fact difficult to achieve. Especially where a plurality of grippers are dependent on each other in moving in the Y direction as in the case of the FIG. 2, it is usual that many pairs of fuel elements which are scheduled to be raised simultaneously can not be found in the refuelling specifications and the partial paralleling can therefore be evaluated significantly.

Referring to FIG. 6, there is illustrated an embodiment of the refuelling control apparatus as applied to the refuelling machine of FIG. 2. In a gripper manipulation procedure 601, operations of grippers 1 and 2 are arranged in sequence of steps. Of operations of the grippers 1 and 2, concurrently feasible ones are described in the same step. For example, in steps 1 and 2, a sole operation of either the gripper 1 or the gripper 2 is described. This is because the constraint on allowed motion in Y direction prevents the two grippers from simultaneously reaching coordinates $(x_1, y_1)$ and coordinates $(x_2, y_2)$, respectively. Contrarily, simultaneous operations are described in step 4 because, in this instance, a Y coordinate position $y_3$ of the gripper 1 and a Y coordinate position $y_4$ of the gripper 2 are so set as to be determined by a Y coordinate position of the fixedly interlocked carriers 202A and 202B.

An allowed motion direction deciding means 602 determines a preferential gripper for which the operation is preferantially executed during a current execution step and besides monitors every moment a positional status $(x_i, y_i, z_i; i=1, 2)$ of each gripper to decide a direction of allowed motion, so that variables $x_{pi}$, $y_{pi}$ and $z_{pi}$ may be transmitted from the allowed motion direction deciding means 602 to either of gripper controlling means 603 and 604. Each of the variables may assume "1" or "0", with "1" being indicative of allowed status and "0" being indicative of constrained status. For example, $x_{p1}=1$ indicates that the gripper 1 is permitted to move in the X direction and $x_{p1}=0$ indicates that the gripper 1 is not permitted to move in the X direction. Similarly, $y_{p1}=1$ indicates that the gripper 1 is permitted to move by itself in the Y direction without recourse to Y-direction movement of the gripper 2 and $y_{p1}=0$ indicates that the gripper 1 is not permitted to move by itself in the Y direction. Accordingly, $y_{p1}=1$ and $y_{p2}=1$ never occur at a time but $x_{p1}=1$, $x_{p2}=1$, $z_{p1}=1$ and $z_{p2}=1$ may occur at a time.

For determination of a preferential gripper, it is stipulated that, when an execution step is for a sole operation, a gripper performing the sole operation should be determined to be a preferential gripper and that when an execution step is for simultaneous operations of the two grippers, one gripper which is anticipated to complete its operation during the execution step earlier than the other should be determined to be a preferential gripper. A gripper not treated as a preferential gripper during the preceding step is determined to be a preferential gripper during the succeeding step.

For a preferential gripper, the gripper controlling means 603 or 604 permits an operation of the preferential gripper to be executed preferentially during an execution step and for a non-preferential gripper, the gripper controlling means 603 or 604 permits an operation of the non-preferential gripper which must be executed initially during an execution step or the succeeding step to be executed in accordance with allowed motion directions of the non-preferential gripper in parallel with an operation of a preferential gripper as far as the operation of the non-preferential gripper does not interfere with the operation of the preferential gripper. Included in the operation of the gripper which must be executed initially during the succeeding step is, for example, the operation through which the gripper 2 is lowered from the upper-limit height to the medium height. In executing the operation, all of the directions of allowed motion are independently controlled.

As an example, during step number 1, the execution step is for a sole operation of the gripper 2. Accordingly, the gripper 2 becomes a preferential gripper and has the priority in controlling allowed motion (of the carrier) in the Y direction. Consequently, $y_{p2}=1$ and $y_{p1}=0$ are held. While the preferential gripper 2 is in operation, the gripper 1 is permitted to move in the X and Z directions in preparation for an operation UP $(x_2, y_2)$ during step number 2. To this end, variables $x_{p1}$ and $z_{p1}$ are not always "0" but assume "1" according to the situation.

An execution step managing means 605 monitors execution status of each gripper to decide the end of an execution step and when confirming the end, it increments a number indicative of the execution step by one.

Figure 7:
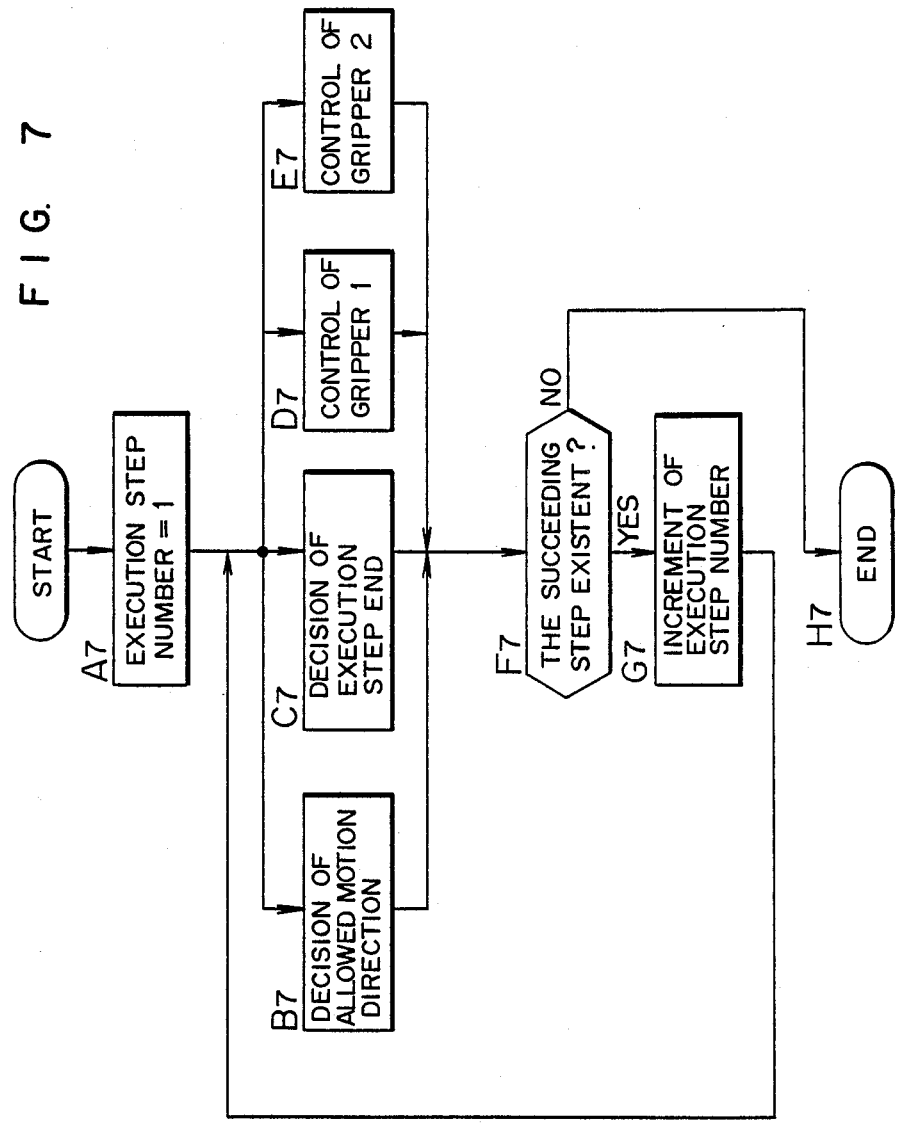
FIG. 7 is a flow chart of processing procedure in the FIG. 6 embodiment.

The procedure of processing in this embodiment will be explained by referring to a flow chart of FIG. 7. Firstly, a number indicative of an execution step is initially set to 1 (one) in block $A_7$ and thereafter, decision of the direction of allowed motion (block B), decision of termination of the execution step (block $C_7$) and gripper control (blocks $D_7$ and $E_7$) are executed in parallel. These processings end with an interruption issued in response to the termination of the execution step. After the termination of the execution step, it is examined whether the succeeding step exists in the gripper manipulation procedure (block $F_7$) and if existent, the execution step number is added with one (block $G_7$). If nonexistent, the procedure ends (block $H_7$). Among the processings in the flow of procedure outlined as above, the contents of processing blocks $B_7$, $C_7$ and $D_7$ or $E_7$ will be described hereinafter in greater detail.

Figure 8:
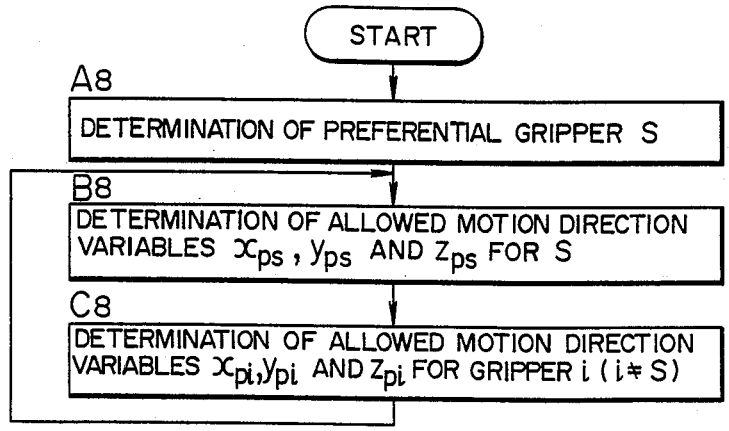
FIG. 8 is a schematic flow chart showing the contents of processing by an allowed motion direction deciding means.

As shown in FIG. 8 preferential gripper S (S=1 or 2) is first determined (block $A_8$). Subsequently, allowed motion direction variables $x_{ps}$, $y_{ps}$ and $z_{ps}$ are determined to be either "1" or "0" in respect of the preferential gripper S in block $B_8$ and in respect of a non-preferential gripper in block $C_8$. Thereafter, the processing blocks $B_8$ and $C_8$ are repeated to update every moment the allowed motion direction variables until an execution step terminates.

Returning to FIG. 3, the concept of allowed motion height $z_a$ playing an important role in determining the direction of allowed motion will be explained prior to giving a further description. The allowed motion height defines a lower limit height of a gripper at which the gripper can move in X/Y-direction. When a gripper suspends a fuel element within the core shown in FIG. 3, the allowed motion height $z_a$ of this gripper equals the medium height $h_m$. When a gripper does not suspend a fuel element within the core, the allowed motion height $z_a$ of this gripper substantially equals the seating height $h_{cb}$. Inside the gate and the pool, the height $z_a$ equals the upper-limit height $h_f$. In this way, the height $z_a$ is determined in accordance with X/Y coordinates and loading status (suspending or not suspending a fuel element).

Figure 9:
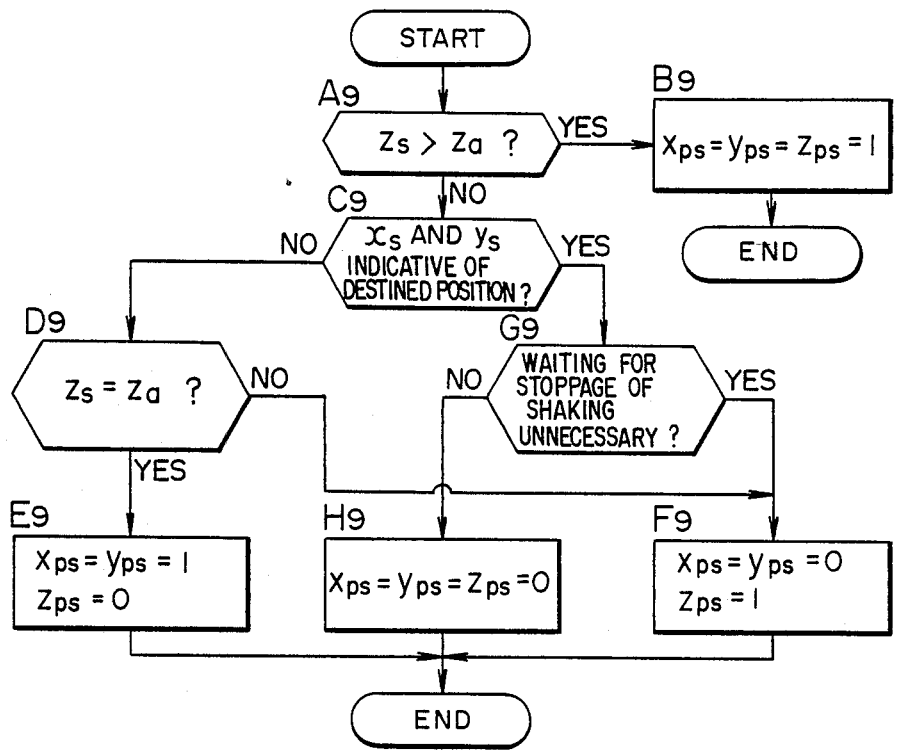
FIG. 9 is a flow chart showing the contents of processing executed for a preferential gripper by the allowed motion direction deciding means.

Turning to FIG. 9, details of the processing for deciding the allowed motion direction variables $x_{ps}$, $y_{ps}$ and $z_{ps}$ of the preferential gripper S are illustrated. A decision is first made as to whether a height $z_s$ of the gripper S is higher than the aforementioned allowed motion height $z_a$ (block A9). If higher, all the directions of motion are allowed (block B9). If the height $z_s$ is equal to or lower than the height $z_a$, it is decided in block C9 whether a horizontal position ($x_s$, $y_s$) reaches a destined horizontal position (a fuel element loading position within the core, inlet or outlet position of the gate or loading position within the pool). If the destined horizontal position is not reached, movement of the gripper to the destined horizontal position is permitted by allowing the Y-direction motion (block D9 and E9) as far as $z_s = z_a$ stands. If the destined horizontal position is not reached under a condition of $z_s < z_a$, the vertical position must recover the height $z_a$ and, therefore, X and Y directions of motion are constrained and only Z-direction motion is allowed (block F9), so that the gripper may be raised. Conversely, if the gripper is located at the destined horizontal position, it is first decided whether waiting for stoppage of shaking is necessary (block G9). A fuel element suspending from the gripper is urged to shake during the horizontal movement of the gripper and the gripper is not permitted to descend below $z_a$ for loading the fuel element into the channel within the core or the rack within the pool until shaking of the fuel element is stopped at the expiration of a predetermined interval of time $T_W$ following stoppage of the horizontal movement. Therefore, the gripper controlling means 603 and 604 have each a timer means 606 or 607 adapted to count time elapsing after stoppage of the horizontal movement and produce counted time as a variable $T_S$ (S=1 or 2). Thus, the ceasing time $T_S$ for the preferential gripper S is read and compared with the predetermined interval of time $T_W$ (for example, 30 seconds) which expires when the fuel element stops shaking. With $T_S \geq T_W$ satisfied, it is determined that the waiting for stoppage of shaking is no more necessary. Since the timer means counts up the ceasing time $T_S$ during Z-direction movement following stoppage of the horizontal movement, the time necessary for the gripper to lower from a height z to the allowed motion height $z_a$ and being in excess of the predetermined interval of time $T_W$ automatically does away with the waiting for stoppage of shaking.

When the waiting for stoppage of a shaking is needed, all the directions of motion are constrained (block H9). Contrarily, when the waiting for stoppage of shaking is unneeded, the Z-direction motion is allowed (block F9). In FIG. 9, the above processing is repeated in one execution step until an interruption is issued.

Figure 10:
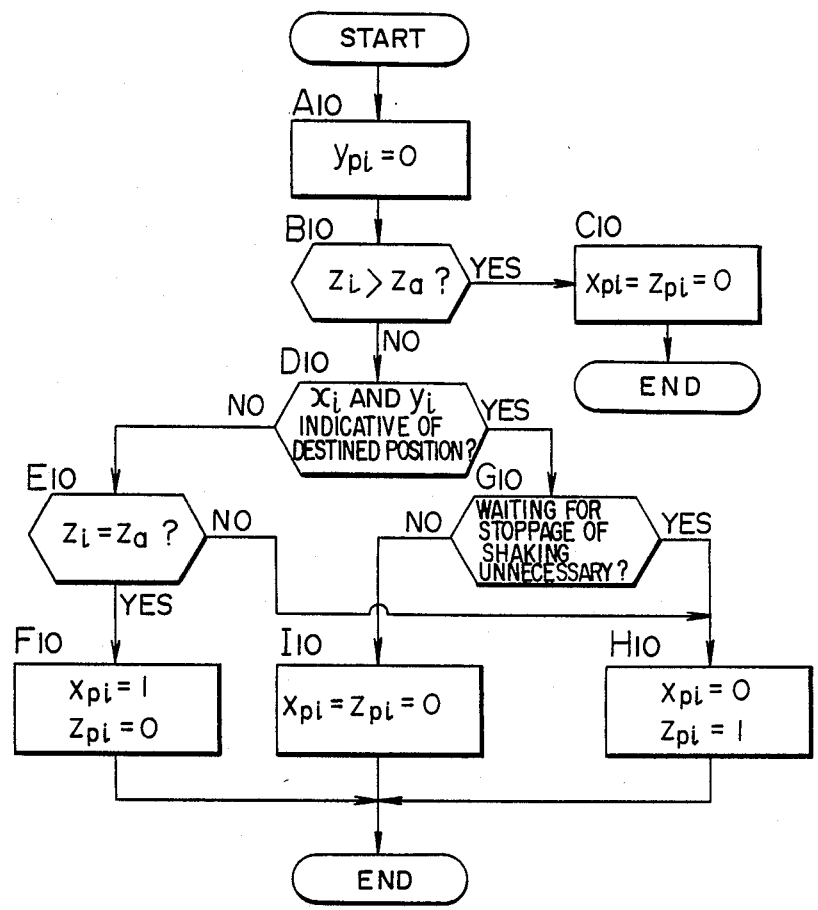
FIG. 10 is a flow chart showing the contents of processing executed for a non-preferential gripper by the allowed motion direction deciding means.

For the non-preferential gripper, the direction of allowed motion is determined in the manner as illustrated in FIG. 10. The Y-direction motion is first constrained unconditionally (block A10). Subsequent processing blocks B10, C10, D10, E10, F10, G10, H10 and I10 are similar to the corresponding blocks of FIG. 9 for the preferential gripper.

Figure 11:
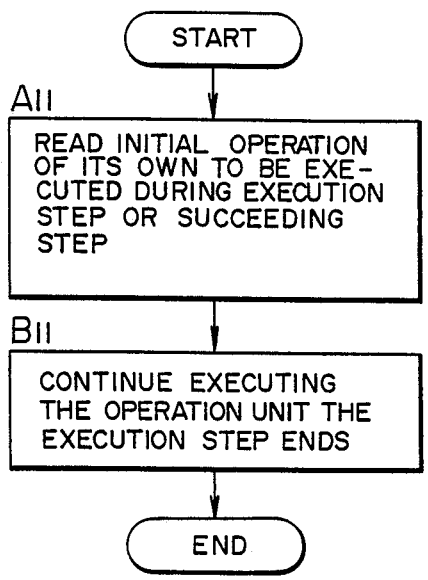
FIG. 11 is a schematic flow chart showing the contents of processing by a gripper controlling means.

FIG. 11 shows a schematic flow chart. Firstly, an operation which must be executed initially by a gripper by itself during an execution step or the succeeding step is read out of the gripper manipulation procedure (block A11). Subsequently, the operation is executed (block B11). When the operation is for the execution step, a normal execution proceeds but when the operation is for the succeeding step, an anticipatory execution proceeds.

Figure 12:
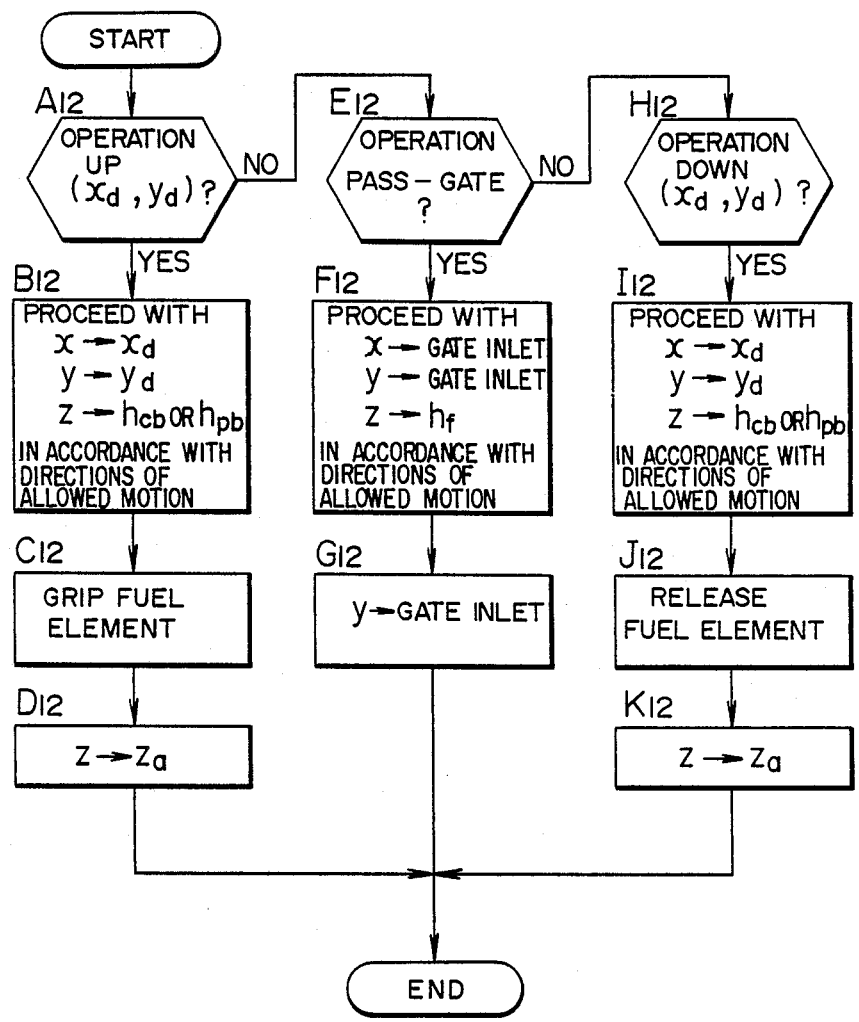
FIG. 12 details the FIG. 11 flow chart.

The execution of operation will be described in greater detail with reference to FIG. 12. When an operation is UP ($x_2$, $y_2$) in block A12, for the purpose of gripping and raising a fuel element, the position (x, y) and the height z of a gripper are first controlled so as to approach a destined position ($x_d$, $y_d$) and the seating height $h_{cb}$ (within the core) or $h_{pb}$ (within the pool), respectively. During this operation, the allowed motion direction variables renewed every moment are monitored to permit only movement in accordance with directions of allowed motion and inhibit movement not being pursuant to directions of allowed motion (block B12). The inhibited movement is suspended until allowed. When the gripper reaches a destined status, it is operated to grip a fuel element (block C12) and then raised to the allowed motion height $z_a$ to end the fuel raising operation (block D12).

When an operation is "PASS-GATE" in block E12, the horizontal position (x, y) and the height z are so controlled as to be destined for the gate inlet and the upper-limit height $h_f$, respectively (block F12). The gripper is then passed through the gate in accordance with the Y direction of allowed motion (block G12).

When an operation is DOWN ($x_d$, $y_d$) in block H12, the horizontal position (x, y) and height z are controlled in accordance with directions of allowed motion so as to approach a destined position ($x_d$, $y_d$) and the seating height, respectively (block I12). After reaching the destined status, the gripper is operated to release a fuel element (block J12) and raised to the allowed motion height $z_a$ to end the lowering operation (block K12).

Figure 13:
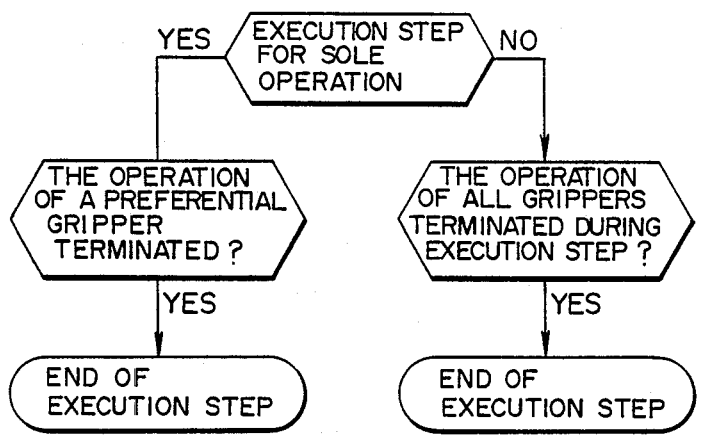
FIG. 13 is a schematic flow chart showing the contents of processing by an execution step managing means.

The termination of an execution step is decided by the execution step managing means 605 in accordance with criteria as shown in FIG. 13. More particularly, when an execution step is for a sole operation, the execution step terminates when the operation of a preferential gripper ends and when an execution step is not for a sole operation, it terminates when all operations during the execution step end.

The oregoing embodiment of the invention has been described by principally referring to two grippers but the processing flow and configuration described so far can also be applicable to three or more grippers.

Although the foregoing embodiment is concentrated on the fuel transfer between a core and a pool, the invention is similarly advantageous to so-called shuffling through which fuel elements located at different positions within the core are mutually exchanged. For the shuffling operation, control is needed which particularly takes into consideration the fact that the allowed motion height $z_a$ changes depending on whether the gripper is loaded or unloaded.

As described above, according to the invention, a trade-off between constraint on the direction of allowed motion of each gripper and constraint attributable to mutual relation between one gripper and another can be met to permit the parallel operation inclusive of the anticipatory operation in accordance with the direction of allowed motion, thereby achieving efficient manipulation of the refuelling machine and timesaving refuelling.

We claim:

1. A method for controlling a refuelling machine of reactor including a plurality of grippers comprised of a plurality of telescopic bars which are telescopically actuatable independently of each other and at least one gripping member mounted to each telescopic bar, said controlling method comprising the steps of:

(a) storing a procedure representative of operations to be carried out by respective grippers in sequence of steps to be executed (gripper manipulation procedure) in gripper manipulation procedure memory means;

(b) determining allowable directions of the movement (directions of allowed motion) of the individual grippers on the basis of a position of each gripper, whether each gripper suspends a load and whether a suspended fuel element is shaking;

(c) executing operations of individual grippers to be carried out thereby in accordance with the directions of allowed motion during an execution step described in said gripper manipulation procedure read out of said gripper manipulation procedure memory means; and (d) deciding whether the operations of the individual grippers are terminated during said execution step, whereby a subsequent execution step is read out of said gripper manipulation procedure memory means when said operations are terminated and when not terminated, said operations of the individual grippers are permitted to continue proceeding.

2. A reactor refuelling machine controlling method according to claim 1 wherein said step (c) further comprises executing operations of individual grippers to be carried out thereby in accordance with the directions of allowed motion during a step following said execution step, said succeeding step being also described in said gripper manipulation procedure read out of said gripper manipulation procedure memory means.

3. A method of controlling a refuelling machine of reactor including a plurality of grippers comprised of a plurality of telescopic bars which are telescopically actuatable independently of each other and at least one gripping member mounted to each telescopic bar, the movement of a particular gripper in at least one direction being constrained by the position of a different gripper, said controlling method comprising the steps of:

(a) storing a procedure representative of operations to be carried out respective grippers in sequence of steps to be executed (gripper manipulation procedure) in gripper manipulation procedure memory means;

(b) determining a preferential gripper by consulting the gripper manipulation procedure read out of said gripper manipulation procedure memory means and determining allowable directions of the movement (directions of allowed motion) of the individual grippers inclusive of said preferential gripper on the basis of a position of each gripper, whether each gripper suspends a load, whether a suspended fuel element is shaking and whether a gripper in question is a preferential one;

(c) executing operations of individual grippers to be carried out thereby in accordance with the directions of allowed motion during an execution step described in said gripper manipulation procedure read out of said gripper manipulation procedure memory means; and (d) deciding whether the operations of the individual grippers are terminated during said execution step, whereby a subsequent execution step is read out of said gripper manipulation procedure memory means when said operations are terminated and said operations of the individual grippers are permitted to continue proceeding when not terminated.

4. A reactor refuelling machine controlling method according to claim 3 wherein said step (c) further comprises executing operations of individual grippers to be carried out thereby in accordance with the directions of allowed motion during a step following said execution step, said succeeding step being also described in said gripper manipulation procedure read out of said gripper manipulation procedure memory means.

5. An apparatus for controlling a refuelling machine of reactor including a plurality of grippers comprised of a plurality of telescopic bars which are telescopically actuatable independently of each other and at least one gripping member mounted to each telescopic bar, said controlling apparatus comprising:

(a) gripper manipulation procedure memory means for storing a gripper manipulation procedure;

(b) allowed motion direction deciding means for determining directions of allowed motion of individual grippers on the basis of a position of each gripper, whether each gripper suspends a load and whether a suspended fuel element is shaking;

(c) gripper controlling means for executing operations of individual grippers to be carried out thereby in accordance with the directions of allowed motion during an execution step described in said gripper manipulation procedure read out of said gripper manipulation procedure memory means; and (d) execution step managing means for deciding whether the operations of the individual grippers are terminated during said execution step and reading a subsequent execution step from said gripper manipulation procedure memory means.

6. A reactor refuelling machine controlling apparatus according to claim 5 wherein said gripper controlling means further executes operations of individual grippers to be done thereby in accordance with the directions of allowed motion during a step following said execution step, said succeeding step being also described in said gripper manipulation procedure read out of said gripper manipulation procedure memory means.

7. An apparatus for controlling a refuelling machine of reactor including a plurality of grippers comprised of a plurality of telescopic bars which are telescopically actuatable independently of each other and at least one gripping member mounted to each telescopic bar, the movement of a particular gripper in at least one direction being constrained by the position of a different gripper, said controlling apparatus comprising:

(a) gripper manipulation procedure memory means for storing a gripper manipulation procedure;

(b) allowed motion direction deciding means for determining a preferential gripper by consulting the gripper manipulation procedure read out of said gripper manipulation procedure memory means and determining directions of allowed motion of the individual grippers inclusive of said preferential gripper on the basis of a position of each gripper, whether each gripper suspends a load, whether a suspended fuel element is shaking and whether a gripper in question is a preferential one;

(c) gripper controlling means for executing operations of individual grippers to be carried out thereby in accordance with the directions of allowed motion during an execution step described in said gripper manipulation procedure read out of said gripper manipulation procedure memory means; and (d) execution step managing means for deciding whether the operations of the individual grippers are terminated during said execution step and reading a subsequent execution step from said gripper manipulation procedure memory means.

8. A reactor refuelling machine controlling apparatus according to claim 7 wherein said gripper controlling means further executes operations of individual grippers to be carried out thereby in accordance with the directions of allowed motion during a step following said execution step, said succeeding step being also described in said manipulation procedure read out of said gripper manipulation procedure memory means.

* * * * *